April 30, 1963 J. W. DELMEGE, JR 3,088,095

RING CHECKING CIRCUIT

Filed April 24, 1961

INVENTOR
JAMES W. DELMEGE, JR.
BY J T Comfort
ATTORNEY

United States Patent Office 3,088,095
Patented Apr. 30, 1963

3,088,095

RING CHECKING CIRCUIT

James W. Delmege, Jr., Saugerties, N.Y., assignor to International Business Machines Corporation, New York, N.Y., a corporation of New York Filed Apr. 24, 1961, Ser. No. 105,205
13 Claims. (Cl. 340—146.1)

Figure 1:
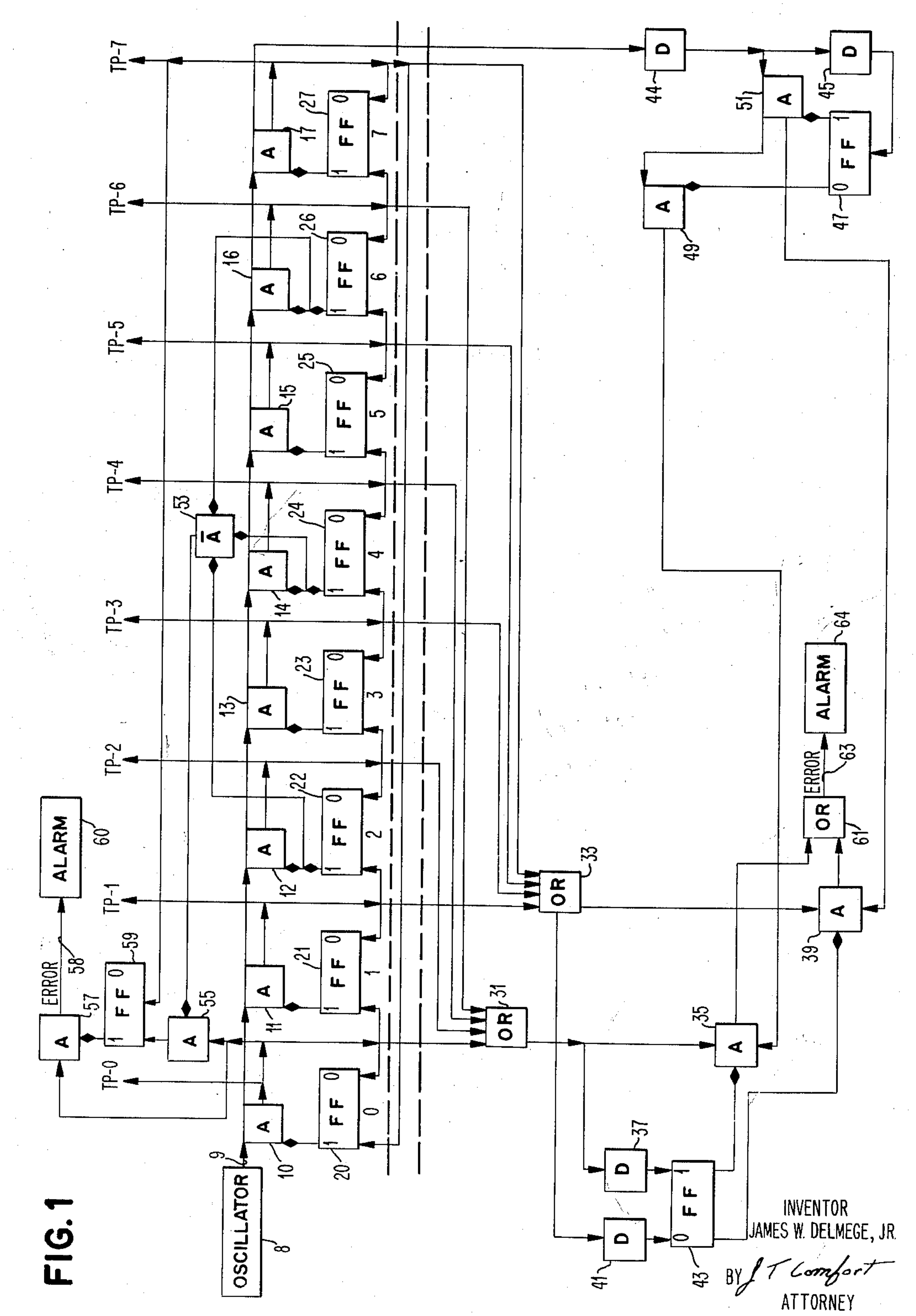

This invention relates to checking circuits and more particularly to an improved circuit for checking the operation of a ring of storage units.

Timing devices such as clock pulse generators are usually comprised of a plurality of storage units in the form of bistable devices cascaded together to form a ring of bistable devices. The basic component of the clock pulse generator, namely the bistable device, may comprise an electronic flip-flop circuit having two stable states designated as the "one" state and the "zero" state. Initially a predetermined one of the plurality of flip-flops in the ring is set to the "one" state. The flip-flop set to the "one" state produces a D.C. level to condition an associated gate. A pulse is applied to the ring to sense all of the And gates, hereinafter designated gates and the gate conditioned by the D.C. level produced by the predetermined flip-flop in the "one" state passes the sense pulse which then resets the predetermined flip-flop to the "zero" state and sets the next succeeding flip-flop to the "one" state. The pulse passed by the conditioned gate is also delivered to another circuit for utilization as a clock pulse. In a similar manner, each succeeding sense pulse applied to the ring causes the flip-flop that is presently in the "one" state to be reset to the "zero" state and the succeeding flip-flop to be set to the "one" state so that the "one" state steps from flip-flop to flip-flop of the ring. The clock pulse delivered steps as the "one" state steps from flip-flop to flip-flop.

Accordingly, in a properly functioning clock pulse generator, one and only one flip-flop is set to the "one" state to condition an associated gate at the time a sense pulse is applied to the clock pulse generator, and one and only one pulse is passed by the conditioned gate and delivered as a clock pulse. Occasionally, due to component failure, breakdown, or noise signals creeping in, more than one of the flip-flops may be set to the "one" state conditioning more than one gate so more than one clock pulse is delivered. This is commonly termed an extra pulse condition. Conversely, none of the flip-flops may be set to the "one" state so that no gate is conditioned at the time a sense pulse is delivered to the clock pulse generator and no clock pulse is delivered. This is commonly termed a missing pulse condition.

Accordingly, it is an object of this invention to provide an improved checking arrangement for checking the storage condition of a ring of storage units.

Another object of this invention is to provide an improved checking arrangement for detecting whether more than one of a plurality of bistable devices are in the "one" state at the same time.

Still another object of this invention is to provide an improved checking arrangement for detecting when the ring of storage units has no information items stored therein.

In accordance with the principles of this invention a checking circuit is provided for a ring of storage units. Sensing means are provided for sensing the storage condition of the first and last storage units of the ring. A first control means is associated with the first storage unit and is normally effective when a first information item is stored therein for controlling the sensing means. A second control means associated with predetermined storage units successive to the first storage unit responds to one of the predetermined successive storage units having a second information item stored therein to inhibit the operation of the first control means when the first information item is stored in the first storage unit. The sensing means is activated when the second information item is subsequently stored in the last storage unit indicating that more than one storage unit in the ring has an information item therein.

Also checking means may be associated with the ring of storage units in combination with the previously described checking circuit for detecting when more than one storage unit adjacent to another storage unit or separated by an even number of storage units has an information item stored therein at the same time. In addition, checking means may be associated with the ring of storage units in combination with previously described checking circuitry for detecting that the ring of storage units has no information items stored therein.

The foregoing and other objects, features and advantages of the invention will be apparent from the following more particular description of a preferred embodiment of the invention, as illustrated in the accompanying drawings.

FIG. 1 is a block diagram of a clock pulse generator and a preferred embodiment of a checking circuit according to the present invention for checking such clock pulse generator.

Throughout the following description and in the accompanying drawings there are certain conventions employed which are familiar to certain of those skilled in the art. Additional information concerning these conventions is as follows: In the block diagram figures of the drawing, a conventional arrowhead is employed to indicate (1) a circuit connection, (2) energization with positive pulses and (3) the direction of pulse travel which is also the direction of control. A diamond shaped arrowhead indicates (1) a circuit connection and (2) energization with a D.C. level. Bold face character symbols appearing within a block identify the common name for the circuit represented, that is, FF indicates a flip-flop, A a positive logical And circuit, $\overline{A}$ a negative logical And circuit, OR a logical Or circuit, and D a delay unit.

Referring now to FIG. 1, the operation of the clock pulse generator will first be described with a general description. Pulses received on conductor 9 from oscillator 8 sample gates 10 through 17. Gates 10 through 17 are conditioned by D.C. levels produced by corresponding flip-flops 20 through 27 when set to their "one" state. Normally, only one flip-flop is set to "one" and the pulse received on conductor 9 is passed by the gate corresponding to the flip-flop set to "one" to reset that flip-flop to "zero" and set the next flip-flop to "one." In a similar manner the "one" state is stepped from flip-flop to flip-flop around the ring. The pulses passed by the conditioned gates are also delivered on the lines TP0–TP7 to a utilization device for use as clock pulses.

The detection of extra or missing pulses will next be described. Two flip-flops in a clock pulse generator set to their "one" state during the same interval between the sense pulses causing the generation of extra pulses are either (1) separated by an odd number of flip-flops, or (2) are adjacent or separated by an even number of flip-flops. In the preferred embodiment described hereinafter, conditions (1) and (2) above are detected by different circuits.

The detection of the generation of extra pulses caused by condition (1) wherein two flip-flops set to "one" during the same interval between sense pulses are separated by an odd number of flip-flops will first be described.

The following Table 1 illustrates how the "one" state of two flip-flops advances around the ring.

TABLE 1

| Flip-flops | 0 | 1 | 2 | 3 | 4 | 5 | 6 | 7 |
|---|---|---|---|---|---|---|---|---|
| Steps: | | | | | | | | |
| 1 | 1 | 0 | 0 | 0 | 1 | 0 | 0 | 0 |
| 2 | 0 | 1 | 0 | 0 | 0 | 1 | 0 | 0 |
| 3 | 0 | 0 | 1 | 0 | 0 | 0 | 1 | 0 |
| 4 | 0 | 0 | 0 | 1 | 0 | 0 | 0 | 1 |
| 5 | 1 | 0 | 0 | 0 | 1 | 0 | 0 | 0 |

Assume for the purposes of this description that the clock pulse generator has been working correctly up to this time, and that, now an error occurs so that the zero and four flip-flops 20 and 24 are set to their "one" states. In steps 1 of Table 1 it can be seen that the zero and four flip-flops are separated by an odd number of flip-flops. Further assume that error detecting flip-flop 59 is reset to its "zero" state so that gate 57 is deconditioned and And-Not circuit 53 produces a D.C. level to condition gate 55 when all flip-flops 22, 24 and 26 are reset to "zero."

The four flip-flop 24 set to its "one" state produces a D.C. level causing And-Not circuit 53 to produce a D.C. level which deconditions gate 55. The zero and four flip-flops 20 and 24, respectively, set to their "one" states produce a D.C. level from their "one" side to condition gates 10 and 14. A pulse received on conductor 9 from oscillator 8 samples gates 10 through 17, is passed by gates 10 and 14 and causes the one and five flip-flops 21 and 25, respectively, to be set to "one" and the zero and four flip-flops 20 and 24, to be reset to "zero" (as shown in Table 1, step 2). The pulse passed by gate 10 also samples gates 55 and 57 which are both deconditioned. Therefore, flip-flop 59 is not set and no error pulse is delivered on conductor 58 to alarm circuit 60.

If no error had occurred and only the one flip-flop 20 had been set, gate 55 would have been conditioned by a D.C. level from And-Not circuit 53, and flip-flop 59 would have been set. Due to the transition time required to reverse the state of flip-flop 59 relative to the duration of the input pulse, gate 57 would have been sampled prior to the transition of the flip-flop 59 to the "one" state and no error alarm would be signaled.

The next pulse received on conductor 9 from oscillator 8 samples gates 10 through 17, is passed by gates 11 and 15 and causes the two and six flip-flops 22 and 26, respectively, to be set to "one" and the one and five flip-flops 21 and 25, respectively, to be reset to "zero" (as shown in step 3 of Table 1).

The next pulse received on conductor 9 causes the two and six flip-flops 22 and 26, respectively, to be reset to "zero" and the three and seven flip-flops 23 and 27, respectively, to be set to their "one" state (step 4 of Table 1).

The next pulse received on conductor 9 again samples gates 10 through 17 and is passed by gates 13 and 17 to cause the zero and four flip-flops 20 and 24, respectively, to be set to "one" and the three and seven flip-flops 23 and 27, respectively, to be reset to "zero" (step 5, Table 1). The pulse passed by gate 17 is also applied to the complement input of flip-flop 59 to set that flip-flop to its "one" state. Flip-flop 59 thereupon produces a D.C. level from its "one" side to condition gate 57. The D.C. level produced by flip-flop 59 from its one side at this time is indicative of an error condition that two or more flip-flops are set to their "one" state during the same interval between sense pulses. If no error had occurred, flip-flop 59 would have been in its "one" state and reset to its "zero" state at this time and gate 57 would not be conditioned.

The four flip-flop 24 set to its "one" state causes And-Not circuit 53 to produce a D.C. level which deconditions gate 55. The next pulse received on conductor 9 is passed by gate 10, samples gate 55, which is deconditioned, and is passed by gate 57. The pulse passed by gate 57 is delivered on conductor 58 to alarm circuit 60 to indicate that an error has been detected. If no error had occurred gate 57 would not be conditioned, no pulse would be delivered on conductor 58, and no error would be indicated.

Thus, any two flip-flops set to their "one" state during the same interval between the sense pulses and separated by an odd number of flip-flops cause a signal to be delivered on conductor 58 to indicate an error as the clock pulses are stepped about the ring. Modifications may be made to the circuitry of the preferred embodiment to construct checking circuitry consistent with the principles of this invention. For instance, an And circuit could be substituted for the And-Not circuit with the D.C. levels from the "zero" side of the flip-flops connected to the And circuit. Also the D.C. levels from the "one" side of all flip-flops but the first flip-flop could be connected to the And-Not circuit and all extra pulse conditions could be detected.

The detection of the generation of extra pulses caused by two flip-flops or more set to "one" during the same interval between sense pulses and separated by an odd number of flip-flops may be described in another manner. If And-Not circuit 53 and gate 55 were not present flip-flop 59 would alternatively be complemented to its "one" or "zero" state so that as one or more "one" states were stepped around the ring eventually flip-flop 59 would be complemented to its "one" state to condition gate 57 so the next pulse passed by gate 10 would be passed by gate 57 to signal an alarm. The checking circuit without gate 55 and And-Not circuit 53 would thus periodically provide an indication that one or more pulses were circulating about the ring.

The addition of And-Not circuit 53 and gate 55 provides an inhibit or control so that if only one pulse is circulating around the ring the checking circuit is inhibited from signaling an alarm. Assume that only one pulse is circulating around the ring and flip-flop 20 is set to "one." As has been previously described, And-Not circuit 53 produces a D.C. level to condition gate 55 when the flip-flops it is associated with are all reset to "zero." Gate 10 is conditioned by the D.C. level produced by flip-flop 20 set to its "one" state and passes the next sense pulse from oscillator 8 to sample gate 55. Gate 55 when conditioned by the D.C. level produced from And-Not circuit 53 passes the pulse passed by gate 10 to set flip-flop 59 to its "one" state. Due to the transition time required to reverse the state of flip-flop 59 relative to the duration time of the input pulse, gate 57 is sampled prior to the transition of flip-flop 59 to the "one" state and no alarm is signaled. As the "one" stated is stepped around the ring, flip-flop 59 is complemented to its "zero" state and as long as only one pulse circulates in the ring the process hereinbefore described is repeated and no error alarm is signaled. However, if an error does occur and two flip-flops separated by an odd number of flip-flops become set to the "one" state during the same interval between sense pulses the inhibit is disabled as previously described and an error alarm is signaled.

The detection of extra pulses caused by two flip-flops set to their "one" state during the same interval between sense pulses and either adjacent or separated by an even number of flip-flops and the detection of missing pulses caused by the faliure of a flip-flop to be set to "one" will next be described. The operation of this checking circuitry will first be described with the clock pulse generator operating correctly.

Initially assume that flip-flop 43 is set to its "one" state and flip-flop 47 is reset to its "zero" state and that only one pulse is circulating in the clock pulse generator and no error condition exists. Further, assume that the next pulse produced by the ring counter is an odd pulse passed by the one of the odd numbered gates, and delivered to Or circuit 33. The odd pulse from Or circuit 33 samples gate 39 which is deconditioned as flip-flop 43 is set to its "one" state. The output of Or circuit 33 is also applied after delay by delay circuit 41 to the reset side of flip-flop 43 to set that flip-flop to its "zero" state. The pulse received on conductor 9 after application to the clock pulse generator is applied to delay circuit 44 and after suitable delay samples gates 49 and 51. The pulse is passed by gate 49 conditioned by a D.C. level from the "zero" side of flip-flop 47. Delay 44 is selected to provide a longer delay than delays 37 and 41 to allow flip-flop 43 to be reset to "zero" before a pulse is passed by gate 49. Thereupon the pulse passed by gate 49 samples gate 35 which has been deconditioned as flip-flop 43 has been reset to "zero." The pulse received on conductor 9 after delay in delay circuit 44 is also applied to the complement input of flip-flop 47 after further delay by delay circuit 45 to set flip-flop 47 to its "one" state.

The next pulse received on conductor 9 is passed by an even numbered gate as an even pulse and delivered to Or circuit 31. The even pulse samples gate 35 which is deconditioned as flip-flop 43 is set to "zero." The even pulse, after delay by delay circuit 37 is applied to the "one" side of flip-flop 43 to set that flip-flop to its "one" state. The pulse received on conductor 9 after delay by delay circuit 44 samples gates 49 and 51 and is passed by gate 51 presently conditioned by the "one" side of flip-flop 47 to sample gate 39 which is deconditioned as flip-flop 43 is set to "one" at this time. Flip-flop 47 is then complemented to its "zero" state after delay by delay circuit 45. Thus, during normal operation of the ring counter, flip-flop 43 is set and reset to insure that no pulses from Or circuits 31 and 33 are passed by gates 35 and 39. Flip-flop 47 is complemented alternatively to its "one" and "zero" states to condition gates 49 or 51 to pass a pulse from oscillator 8 which during a normal operation samples deconditioned gates 35 and 39.

The detection of two flip-flops set to their "one" state during the same interval between sense pulses and either adjacent or separated by an even number of flip-flops will next be described. Assume for instance that the four and seven flip-flops 24 and 27, respectively, are set to the "one" state. The next pulse received on conductor 9 is passed by gate 14 which is conditioned by flip-flop 24 in its "one" state and is also passed by gate 17 which is conditioned by flip-flop 27 in its "one" state. The pulses passed by gates 14 and 17 are applied to Or circuits 31 and 33 respectively, the outputs of which sample gates 35 and 39. Flip-flop 43 has previously been set to its "one" state or reset to its "zero" state so either gate 35 or 39 is conditioned. Therefore, gate 35 or 39 passes a pulse to Or circuit 61 which is delivered on conductor 63 to an alarm device 64 to indicate that an error has occurred.

The detection of a missing pulse will next be described. Assume that flip-flop 43 is reset to "zero" and flip-flop 47 is set to "one." Assume also that the last pulse delivered by the ring was an odd pulse and now the pulse circulating in the ring is lost. Thus flip-flop 43 is not set and remains in its "zero" state producing a D.C. level to condition gate 39. The next pulse received on conductor 9 after delay in delay circuit 44 samples gates 49 and 51. Gate 51 (conditioned by the "one" side of flip-flop 47) passes the pulse which then samples and is passed by gate 39 (conditioned by the "zero" side of flip-flop 43). The pulse passed by gate 39 is applied to Or circuit 61 and delivered on conductor 63 to an alarm device 64 to indicate that an error condition has been detected in the ring counter.

In summary, checking circuitry has been described which signals an alarm when two or more flip-flops separated by an odd number of flip-flops are set to the "one" state during the same interval between sense pulses. Additional checking circuitry signals an alarm when two or more flip-flops adjacent or separated by an even number of flip-flops are set to the "one" state during the same interval between sense pulses. Further circuitry has been described which signals an alarm when no flip-flop is set to "one" at the time a sense pulse is applied to the ring.

While the invention has been particularly shown and described with reference to a preferred embodiment thereof, it will be understood by those skilled in the art that the foregoing changes and other changes in form and details may be made therein without departing from the spirit and scope of the invention.

What is claimed is:

1. A checking circuit for a ring of storage units each of which is capable of storing an information item, comprising,
 means for sensing the storage condition of the last storage unit of said ring,
 first control means associated with said first storage unit normally effective when a first information item is stored in said first storage unit for controlling said sensing means,
 and second control means associated with predetermined storage units successive to said first storage unit and rendered effective when one of said successive storage units has a second information item stored therein for inhibiting the operation of said first control means when said first information item is stored in said first storage unit,
 said sensing means activated when said second information item is subsequently stored in said last storage unit to produce a signal indicating that more than one of said plurality of storage units has an information item stored therein.

2. A checking circuit for a ring of bistable devices comprising,
 means for sensing the storage conditions of the last bistable device of said ring,
 first control means for sensing the storage condition of said first bistable device normally effective for controlling said sensing means when said first bistable device is set to the "one" state,
 and second control means associated with predetermined bistable devices successive to said first bistable device and rendered effective when one of said successive bistable devices is set to the "one" state for inhibiting the operation of said first control means when said first bistable device is also set to the "one" state,
 said sensing means activated when said last bistable device is subsequently set to the "one" state to produce a signal indicating that more than one of said bistable devices are set to the "one" state at the same time.

3. A checking circuit for a ring of storage units comprising,
 means for sensing the output signals of the first and last storage units of said ring,
 first control means for sensing the output signal of said first storage unit normally effective for controlling said sensing means when a first information item is stored in said first storage unit,
 second control means associated with predetermined storage units successive to said first storage units and rendered effective when one of said successive storage units has a second information item stored therein for inhibiting the operation of said first control means when said first information item is stored in said first storage unit,
 said sensing means activated when said second information item is subsequently stored in said last storage unit and being effective to produce a signal if said second information item is subsequently stored in said first storage unit,
 and means operatively coupled to said sensing means and responsive to the signal produced thereby for producing an indication that more than one information item is stored in the ring of storage units at the same time.

4. A checking circuit for a ring of storage units each of which is capable of storing an information item,
comprising,
means for sensing the storage condition of the first and last storage units of said ring,
gating means for sensing the storage condition of said first storage unit normally effective for controlling said sensing means if first information item is stored in said first storage unit,
and an And-Not circuit associated with predetermined storage units successive to said first storage unit and rendered effective when one of said successive storage units has a second information item stored therein for inhibiting the operation of said gating means when said first information item is stored in said first storage unit,
said sensing means activated when said second information item is subsequently stored in said last storage unit to produce a signal indicating that more than one of said plurality of storage units has an information item stored therein.

5. A checking circuit for a ring of storage units each of which is capable of storing an information item,
comprising,
means for sensing the storage condition of the first and last storage units of said ring,
gating means for sensing the storage condition of said first storage unit normally effective for controlling said sensing means when a first information item is stored in said first storage unit,
and an And circuit associated with predetermined storage units successive to said first storage unit and rendered effective when one of said successive storage units has a second information item stored therein for inhibiting the operation of said gating means when said first information item is stored in said first storage unit,
said sensing means activated when said second information item is subsequently stored in said last storage unit to produce a signal indicating that more than one of said plurality of storage units has an information item stored therein.

6. A control circuit for a checking circuit associated with a ring of storage units, each of which is capable of storing an information item,
said checking circuit effective to product an output signal when one or more of said storage units of said ring has an information item stored therein,
comprising,
first control means associated with the first storage unit of said ring,
and second control means associated with predetermined storage units successive to said first storage unit and rendered effective when all of said successive predetermined storage units have no information items stored therein for conditioning said first control means,
said first control means when conditioned being effective if an information item is stored in said first storage unit for controlling said checking circuit to prohibit the production of an output signal when only one storage unit of said ring has an information item stored therein.

7. A control circuit for a checking circuit associated with a ring of bistable devices,
said checking circuit effective to produce an output signal when one or more of said bistable devices of said ring are set to the "one" state,
comprising,
first control means for sensing the storage condition of the first bistable device of said ring,
and second control means associated with predetermined bistable devices successive to said first predetermined bistable device and rendered effective when all of said successive bistable devices are set to the "zero" state for conditioning said first control means,
said first control means when conditioned being effective if said first bistable device is set to the "one" state for controlling said checking circuit to prohibit the production of an output signal when only one bistable device of said ring is set to "one."

8. A control circuit for a checking circuit associated with a ring of storage units, each of which is capable of storing an information item,
said checking circuit effective to produce an output signal when one or more of said storage units of said ring has an information item stored therein,
comprising,
gating means for sensing the storage condition of the first storage unit of said ring,
and an And-Not circuit associated with predetermined storage units successive to said first storage unit and rendered effective when all of said successive predetermined storage units have no information items stored therein for conditioning said gating means,
said gating means when conditioned being effective if an information item is stored in said first storage unit for controlling said checking circuit to prohibit the production of an output signal when only one storage unit of said ring has an information item stored therein.

9. A control circuit for a checking circuit associated with a ring of storage units, each of which is capable of storing an information item,
said checking circuit effective to produce a signal when one or more of said storage units has an information item stored therein,
comprising,
gating means for sensing the storage condition of the first storage unit of said ring,
and an And circuit associated with predetermined storage units successive to said first storage unit and rendered effective when all of said successive predetermined storage units have no information items stored therein for conditioning said gating means,
said gating means when conditioned being effective if an information item is stored in said first storage unit for controlling said checking circuit to prohibit the production of an output signal by said checking circuit when only one storage unit of said ring has an information item stored therein.

10. A checking circuit for a ring of bistable devices, each of which produces an output signal when set to the "one" state,
comprising,
means for sensing the output signal of the last bistable device of said ring,
first control means associated with said sensing means,
second control means for sensing the output signal of the first bistable device of said ring, said second control means responsive to an output signal from said first bistable device and effective to apply a first control signal to the first control means,
said first control means normally effective to apply said first control signal to said sensing means,
and third control means associated with the bistable devices successive to said first bistable device and rendered effective when one of said successive bistable devices produces an output signal to apply a second control signal to inhibit the operation of said first control means when an output signal is produced by said first bistable device,
said sensing means subsequently responsive to an output signal from said last bistable device to produce an indication that more than one signal is circulating in the ring of bistable devices at the same time.

11. A checking circuit for a ring of bistable devices, each of which produces an output signal when set to the "one" state, comprising, means for sensing the output signal of the last bistable device of said ring, first control means associated with said sensing means, second control means for sensing the output signal of the first bistable device of said ring, said second control means responsive to an output signal from said first bistable device and effective to apply the first control signal to the first control means, said first control means normally effective to apply said first control signal to said sensing means, third control means associated with the bistable devices successive to said first bistable device and rendered effective when one of said successive bistable devices produces an output signal to apply a second control signal to inhibit the operation of said first control means when an output signal is produced by said first bistable device, said sensing means subsequently responsive to an output signal from said last bistable device to produce an indication that more than one signal is circulating in the ring of bistable devices at the same time, and means associated with said ring for detecting and indicating when no signal is circulating in the ring of bistable devices.

12. A checking circuit for a ring of bistable devices, each of which produces an output signal when set to the "one" state, comprising, means for sensing the output signal of the last bistable device of said ring, first control means associated with said sensing means, second control means for sensing the output signal of the first bistable device of said ring, said second control means responsive to an output signal from said first bistable device and effective to apply a first control signal to the first control means, said control means normally effective to apply said first control signal to said sensing means, third control means associated with the even numbered bistable device successive to said first bistable device and rendered effective when one of said successively even numbered bistable devices produces an output signal to apply a second control signal to inhibit the operation of said first control means when an output signal is produced by said first bistable device, said sensing means subsequently responsive to an output signal from said last bistable device to produce an indication that more than one signal separated by an odd number of bistable devices is circulating in the ring of bistable devices at the same time, and means associated with said ring for detecting and indicating when more than one signal adjacent to another signal or separated by an even number of bistable devices is circulating in the ring of bistable devices at the same time.

13. A checking circuit for a ring of bistable devices, each of which produces an output signal when set to the "one" state, comprising, means for sensing the output signal of the last bistable device of said ring, first control means associated with said sensing means, second control means for sensing the output signal of the first bistable device of said ring, said second control means responsive to an output signal from said first bistable device and effective to apply a first control signal to the first control means, said control means normally effective to apply said first control signal to said sensing means, third control means associated with the even numbered bistable device successive to said first bistable device and rendered effective when one of said successively even numbered bistable devices produces an output signal to apply a second control signal to inhibit the operation of said first control means when an output signal is produced by said first bistable device, said sensing means subsequently responsive to an output signal from said last bistable device to produce an indication that more than one signal separated by an odd number of bistable devices is circulating in the ring of bistable devices at the same time, means associated with said ring for detecting and indicating when more than one signal adjacent to another signal or separated by an even number of bistable devices is circulating in the ring of bistable devices at the same time.

and means associated with said ring for detecting and indicating when no signal is circulating in the ring of bistable devices.

References Cited in the file of this patent

UNITED STATES PATENTS

| | | |
|---|---|---|
| 2,724,104 | Wild | Nov. 5, 1955 |
| 2,769,971 | Bashe | Nov. 6, 1956 |
| 3,017,620 | Abzug | Jan. 16, 1962 |